US010423846B2

(12) United States Patent
Wulf

(10) Patent No.: US 10,423,846 B2
(45) Date of Patent: Sep. 24, 2019

(54) METHOD FOR IDENTIFYING A DRIVER CHANGE IN A MOTOR VEHICLE

(71) Applicant: Robert Bosch GmbH, Stuttgart (DE)

(72) Inventor: Felix Wulf, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/661,721

(22) Filed: Jul. 27, 2017

(65) Prior Publication Data

US 2018/0053061 A1 Feb. 22, 2018

(30) Foreign Application Priority Data

Aug. 17, 2016 (DE) .......................... 10 2016 215 297

(51) Int. Cl.
*G06K 9/00* (2006.01)
*G06K 9/78* (2006.01)

(52) U.S. Cl.
CPC ..... *G06K 9/00845* (2013.01); *G06K 9/00288* (2013.01); *G06K 9/00335* (2013.01); *G06K 9/00832* (2013.01); *G06K 9/78* (2013.01); *B60Y 2302/03* (2013.01); *G06K 9/00604* (2013.01)

(58) Field of Classification Search
None
See application file for complete search history.

(56) References Cited

U.S. PATENT DOCUMENTS

2007/0159344 A1* 7/2007 Kisacanin .......... G06K 9/00362
340/576
2008/0080741 A1* 4/2008 Yokoo ................... B60W 40/09
382/104
2012/0162797 A1* 6/2012 Luo .......................... B60R 1/02
359/843

FOREIGN PATENT DOCUMENTS

DE 10220782 A1 11/2003
DE 102014212758 A1 1/2016

* cited by examiner

*Primary Examiner* — Stephen P Coleman
(74) *Attorney, Agent, or Firm* — Norton Rose Fulbright US LLP; Gerard Messina

(57) ABSTRACT

A method for identifying a driver change in a motor vehicle with the aid of an interior camera for monitoring the driver, which is characterized in that a driver change is detected when the head of the driver is not detected in the viewing range of the camera. In addition, a corresponding device and a computer program and a machine-readable memory medium are provided.

10 Claims, 2 Drawing Sheets

METHOD FOR IDENTIFYING A DRIVER CHANGE IN A MOTOR VEHICLE

CROSS REFERENCE

The present application claims the benefit under 35 U.S.C. § 119 of German Patent Application No. DE 102016215297.1 filed on Aug. 17, 2016, which is expressly incorporated herein by reference in its entirety.

FIELD

The present invention relates to a method for identifying a driver change in a motor vehicle with the aid of an interior camera for monitoring the driver, which is characterized in that a driver change is detected when the head of the driver is not detected in the viewing range of the camera. In addition, a corresponding device and a computer program and a machine-readable memory medium are provided.

BACKGROUND INFORMATION

German Patent Application No. DE 10 220 782 A1 describes an emergency system for motor vehicles, including a driver monitoring system for detecting a driver's unfitness to drive, and including a control unit for the controlled deceleration of the vehicle if an unfitness to drive is detected, characterized in that the control unit is combined with a driver assistance system which includes a sensor system for detecting the surrounding traffic conditions. The systems used for detecting the biometric data may also be designed in such a way that they are able to automatically identify the driver. In this case, the follow-up mode is terminated when a driver change is detected.

Furthermore, German Patent Application No. DE 10 2014 212 758 A1 describes a method and a device used for identifying the driver of a vehicle. The biometric parameters which could be detected and which may be additionally utilized for identification are, for example, the fingerprint, the hand geometry, the facial geometry, the heart rate, the grip position (and force) on the steering wheel, and the weight or the weight distribution on the seat.

In addition, present-day eye-tracking systems are capable of automatedly detecting a head model (the relative position of all relevant facial landmarks) of a new person. This is carried out at the beginning of every driving operation. After the so-called head model has been initialized, these systems are able to identify and observe (track) the position of the head of the driver. If a driver change has been detected, it is uncertain, however, whether the driver has actually changed. The driver change cannot be correctly detected in system configurations in particular in which image-based "face identification" is not available. Consequently, the head model of the driver cannot be re-initialized, which results in a substantially poorer performance of the eye-tracking system.

SUMMARY

An example method according to the present invention makes it possible for a driver change to be detected and for the head model to be re-initialized with the aid of a tracking system in a "standalone" manner, i.e., without other sensors or systems. According to the present invention, this is made possible with the aid of the features described herein. Refinements of the present invention are described herein.

An example method according to the present invention for identifying a driver change in a motor vehicle with the aid of an interior camera for monitoring the driver is characterized in that a driver change is detected when the head of the driver is not detected in the viewing range of the interior camera.

This is understood to mean that a driver change is assumed when the camera cannot detect the head of the driver. Monitoring the driver with the aid of an interior camera makes a plurality of functions possible; for example, with the aid of so-called eye-tracking, the viewing direction of the driver is ascertainable, fatigue may be detected, and the capability to take over may be ascertained, for example in the case of (partially) autonomous driving operations. The head of the driver is a piece of information in this case, which may be ascertained from the data of the interior camera in most cases of driver monitoring. The method may therefore be utilized as a standalone approach, i.e., further sensors or systems or data are not required in order to identify a driver change. With the aid of the method, it is also possible to avoid unnecessary re-initializations, but a necessary re-initialization may still be carried out in order to obtain valid results.

In one advantageous specific embodiment, the method is characterized in that a driver change is detected when the head of the driver is not detected in the viewing range of the interior camera for a defined first time period.

This is understood to mean that it is assumed that the driver has left the driver's seat and that the driver has changed only if the head is not identified in the viewing range of the camera for a defined time period. Surprisingly, it was found that even a time period of 10 seconds offers a high level of reliability in the ascertainment of a driver change. By taking the time component into account, a driver change is advantageously detected with a higher level of reliability.

In one possible embodiment, the method is characterized in that a driver change is detected when it is detected that the head of the driver moves to the left or the right out of the viewing range of the interior camera.

This is understood to mean that a check is carried out to determine whether a movement of the driver's head out of a lateral area of the recorded image is detectable in the recordings before the driver's head is no longer detected. It is possible, of course, that the driver has left the driver's seat. In this case, he may leave the seat, for example through the driver's door, if the automobile is at a standstill. In some vehicles, the driver could also leave the driver's seat toward the center of the vehicle, for example in order to move to another seat. Therefore, both directions are checked. In the case of autonomously driving vehicles, this is even possible during the driving operation, if necessary. Advantageously, the reliability of the detection and the quality of the conclusion with respect to a driver change is improved when this additional criterion is taken into consideration.

In one advantageous embodiment, the method is characterized in that a driver change is detected when the head of the driver is not detected in the viewing range of the interior camera for a defined second time period.

As mentioned above, accounting for a time component with respect to the non-detection of the driver's head makes it possible to further increase the reliability of the conclusion. In this case, different time periods may be defined as a function of whether there is only no detection of a driver's head, or whether, in addition, a movement of the driver's head to the left or the right out of the viewing range of the camera was also detected. Surprisingly, it was found that even a time period of 5 seconds offers a high level of reliability in the detection of a driver change if the driver's head has moved to the left or the right out of the viewing range of the camera.

In one alternative refinement, the method is characterized in that a re-initialization of a head model takes place when a driver change is detected.

This is understood to mean that a re-initialization of the head model takes place when a driver change is assumed. This means, a re-initialization is carried out only in the event that a change has been assumed and/or detected. As a result, however, it is still possible to carry out an initialization independently of a start of the vehicle. As mentioned above, a head model includes a relative position of all relevant facial points (so-called facial landmarks). During a re-initialization, the camera, for example, as well as the control unit, are activated. In this case, image data are gathered and evaluated. In addition, a display for the representation of elements for focusing the gaze or for eye tracking may be activated in order to calibrate the settings for the new driver. Advantageously, unnecessary new initializations may be avoided with the aid of the method.

In one possible specific embodiment, the method is characterized in that a driver change is detected on the basis of data of the interior camera with respect to a monitoring of the driver, no further sensors or systems being utilized, in particular.

This is understood to mean that a decision whether a driver change is assumed, i.e., detected, is made solely on the basis of the data of the interior camera. In this case, the data of the interior camera still relate exclusively to the data of the monitoring of the driver. This means, data are ascertained, taken into consideration, and/or evaluated in order to make it possible, for example, to detect the driver's head or to ascertain a movement of the driver's head. In particular, no data which make it possible to identify the driver are ascertained and/or are taken into account. An identification is mostly possible only with the aid of very complex and expensive systems. Advantageously, such systems may be avoided with the aid of the method. By focusing on data for monitoring, less effort is required for ascertaining and evaluating the required data. In addition, no further sensors or systems (in addition to the interior camera) are required—a standalone approach being made possible as a result.

According to the present invention, a device (8) is also provided, which is configured for carrying out the method (11) according to the description.

This is understood to mean, in particular, a control unit which is configured, includes means, and is designed for carrying out the above-described method. For example, the device for identifying a driver change in a motor vehicle, including an interior camera for monitoring the driver, is characterized in that the device is configured for detecting a driver change when the head of the driver is not detected in the viewing range of the camera. In addition to the control unit, the camera, for example, is also understood to be an appropriate device.

According to the present invention, a computer program is also provided, which is configured for carrying out the method (11) according to the description. In addition, a machine-readable memory medium is provided, on which the computer program is stored.

It should be noted that the features described individually in the description may be combined with each other in any technically meaningful way and show further embodiments of the present invention. Further features and advantages of the present invention result from the description of exemplary embodiments with reference to the figures.

DETAILED DESCRIPTION OF EXAMPLE EMBODIMENTS

Figure 1:
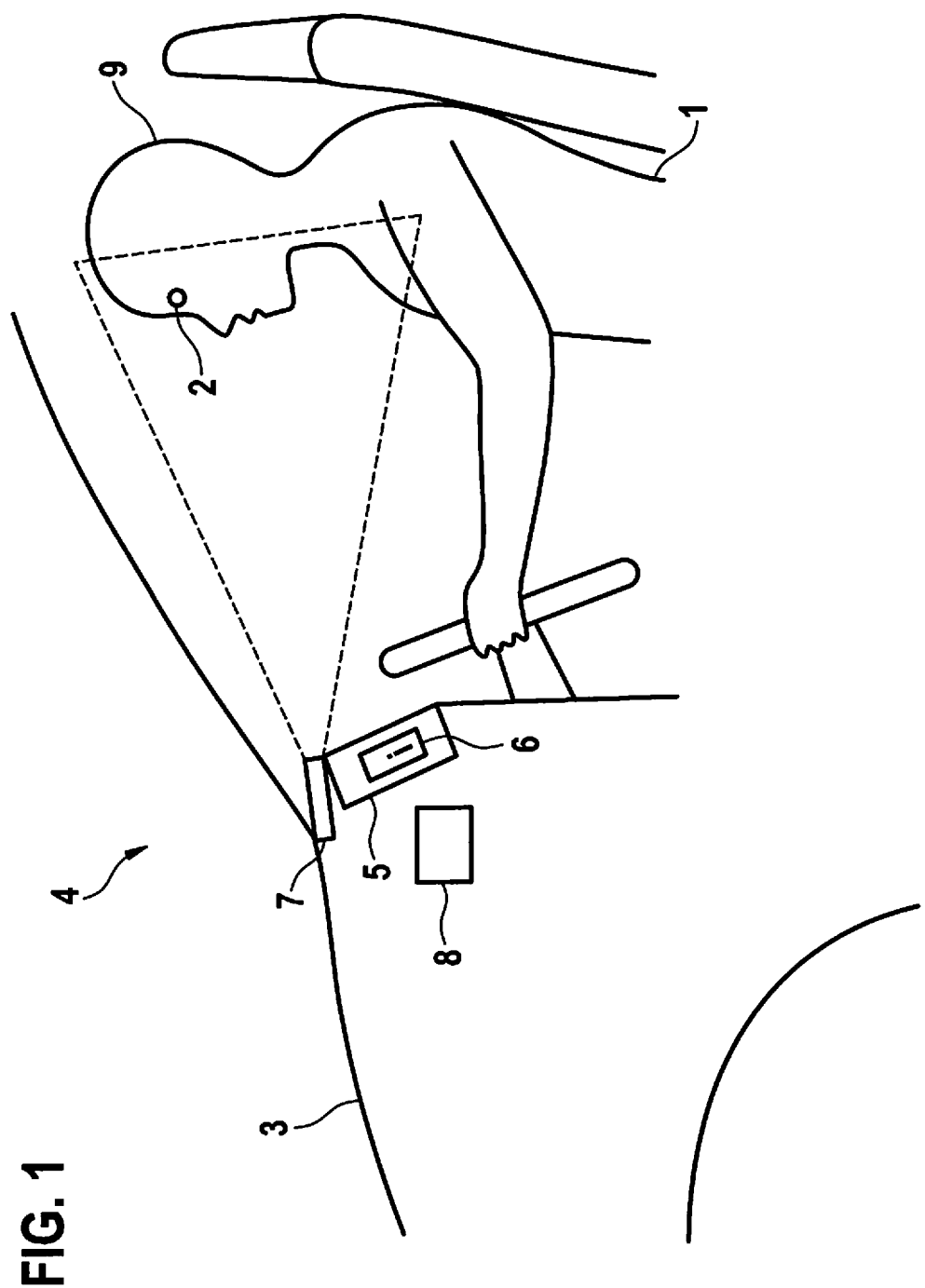
FIG. 1 shows a schematic representation of the devices for the use of the method in a motor vehicle according to one possible embodiment.

FIG. 1 shows a schematic representation of an exemplary device for the use of the method in a motor vehicle. In this case, a driver 1 is shown in a motor vehicle 3. Vehicle 3 includes a driver assistance system 4 for ascertaining the attentiveness of driver 1. For this purpose, characteristics related to attentiveness are observed with the aid of an interior sensor system 7. In the represented embodiment, the viewing direction of eyes 2 of driver 1 is observed with the aid of an interior sensor system 7 designed as a camera. Movements of head 9 of driver 1, in particular safety-related glances, are also monitored. A regulating and control unit 8 for carrying out the method is also provided. This may also be configured for pre-processing the data ascertained with the aid of interior sensor system 7 and/or for carrying out a parameter calculation. A device 5 for outputting information 6 to driver 1 is also provided. This device 5 is designed as a display which outputs visual warning signals, as pieces of information 6, to the driver in the event of inattentiveness. Devices (for example, loudspeakers) which provide for an acoustic transmission (for example, via loudspeakers) or a haptic transmission (for example, with the aid of steering wheel or seat vibrations) of pieces of information 6 to driver 1 are also possible, of course.

Figure 2:
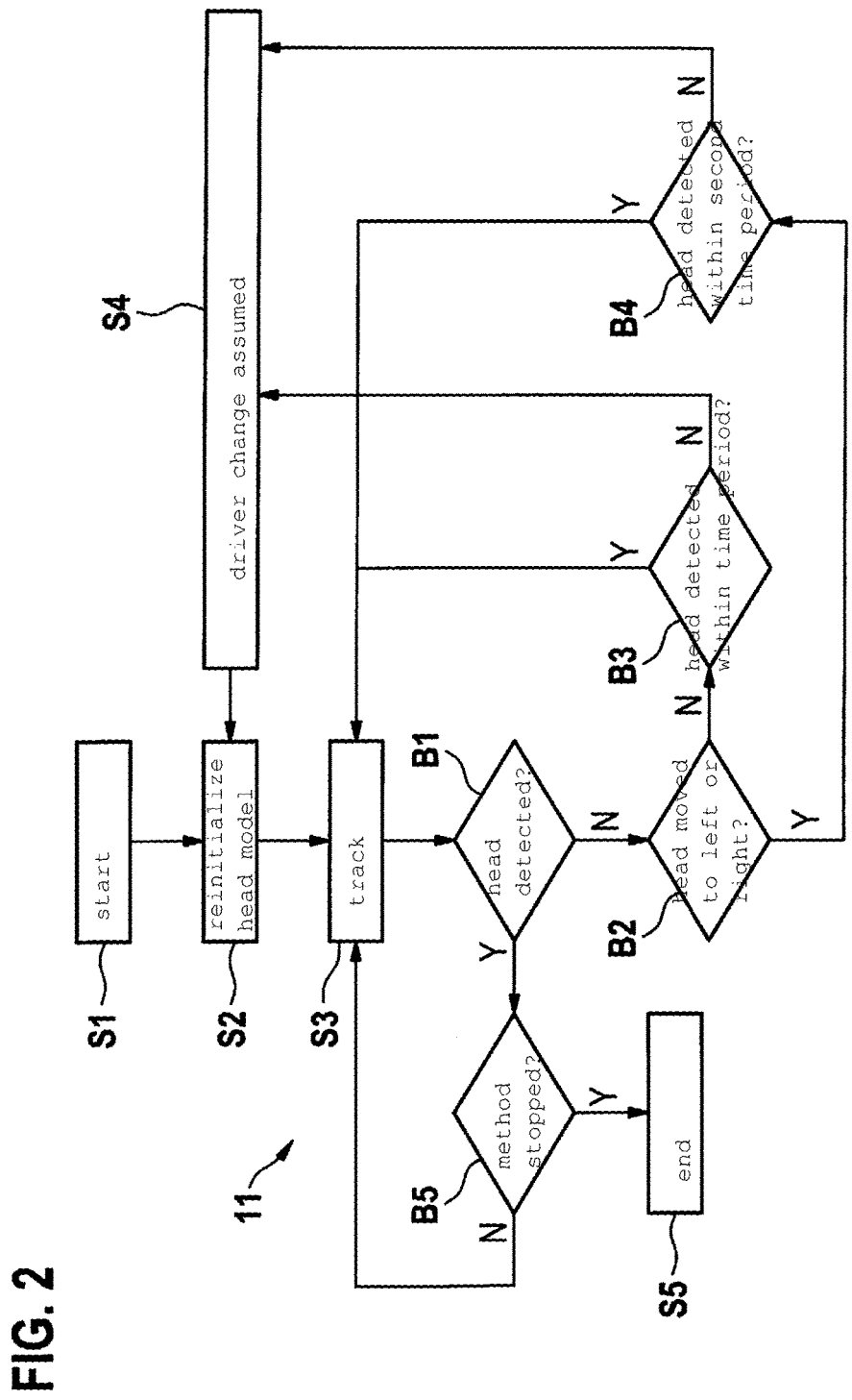
FIG. 2 shows a process diagram of the method according to one possible embodiment.

FIG. 2 shows a process diagram of method 11 according to one possible embodiment. Method 11 starts in a first step S1. The start of the method may be coupled, for example, to the ignition of a vehicle, so that the method is automatically carried out upon each start of the vehicle. In a second step S2, the head model is re-initialized. An initialization of the head model for the particular driver is important in order to obtain a high quality of the subsequent tracking results. The initialization requires some time and resources, however, so that the model should not be re-initialized too frequently. Tracking subsequently takes place in a third step S3. In this case, so-called eye tracking, for example, is carried out, i.e., a monitoring of the present viewing direction of the driver. This monitoring takes place with the aid of the interior camera. The interior camera has a model-dependent viewing range. In addition, the interior camera is to be positioned in such a way that the desired area of the vehicle, for example the head of the driver in a regular driving position, may be detected. This means the entire interior may not be detected.

During the tracking, in a condition B1, a check is now carried out continuously (or at defined times) to determine whether the head of the driver has been detected. If this is the case (Y), a check is carried out with the aid of a further condition B5 to determine whether the method has stopped. If the method has stopped (Y), for example because a manual deactivation is present or the vehicle has been parked, the method ends at step S5. If the method has not stopped (N), however, the tracking continues in step S3.

If the head has not been detected (N) in B1, however, a check is carried out with the aid of the condition B2 to determine whether the head was moved to the left or the right out of the viewing range of the camera. If this is not the case (N), i.e., a conclusion may not be reached as to whether the head has moved to the left or the right out of the viewing range, or if it was detected that the head has not moved to the left or the right out of the viewing range of the camera, a check is carried out in a condition B3 to determine whether the head is detected again within a defined first time period. If this is the case (Y), however, i.e., it was detected that the head has moved to the left or right out of the viewing range of the camera, a check is carried out in a condition B4 to determine whether the head was detected again within a defined second time period. In this case, the defined second time period is shorter, for example, than the defined first time period.

If condition B3 has been met (Y), the tracking is continued in step S3. If condition B3 has not been met (N), it is assumed in a step S4 that a driver change is present. Subsequently, a re-initialization of the head model takes place in step S2. This means, a head model is created for the assumed new driver.

If condition B4 is still met (Y), the tracking is continued in step S3. If condition B4 has not been met (N), it is assumed in a step S4 that a driver change is present. Subsequently, a re-initialization of the head model takes place in step S2. This means, a head model is created for the assumed new driver.

What is claimed is:

1. A method for identifying a driver change in a motor vehicle with the aid of an interior camera for monitoring the driver, the method comprising:
   providing, via a control unit, a head model, which characterizes a head of a driver of the motor vehicle;
   monitoring, with the interior camera and/or an interior sensor system, a present viewing direction of the driver;
   during the monitoring, checking, via the control unit, to determine whether the head of the driver has been detected; and
   detecting, via the control unit, a driver change based on a failure of detecting a head of the driver in a viewing range of the interior camera;
   wherein the interior camera is positioned so that a desired area of the vehicle, which includes a head of the driver in a regular driving position is detectable, and
   wherein a driver change is detected based on the failure to detect the head of the driver in the viewing range of the interior camera for a defined first time period.

2. The method as recited in claim 1, wherein a re-initialization of a head model takes place based on the detection of the driver change.

3. The method as recited in claim 1, wherein a driver change is detected on the basis of data of the interior camera with respect to a monitoring of the driver, no further sensors or systems being utilized.

4. A method for identifying a driver change in a motor vehicle with the aid of an interior camera for monitoring the driver, the method comprising:
   providing, via a control unit, a head model, which characterizes a head of a driver of the motor vehicle;
   monitoring, with the interior camera and/or an interior sensor system, a present viewing direction of the driver;
   during the monitoring, checking, via the control unit, to determine whether the head of the driver has been detected; and
   detecting, via the control unit, a driver change based on a failure of detecting a head of the driver in a viewing range of the interior camera;
   wherein the interior camera is positioned so that a desired area of the vehicle, which includes a head of the driver in a regular driving position is detectable, and
   wherein a driver change is detected based on detection of the head of the driver moving to the left or the right out of the viewing range of the interior camera.

5. The method as recited in claim 4, wherein a driver change is detected based on failure of detecting the head of the driver in the viewing range of the interior camera for a defined second time period.

6. A device to identify a driver change in a motor vehicle with the aid of an interior camera for monitoring the driver, comprising:
   a control unit configured to perform the following:
      providing, via a control unit, a head model, which characterizes a head of a driver of the motor vehicle;
      monitoring, with the interior camera and/or an interior sensor system, a present viewing direction of the driver;
      during the monitoring, checking, via the control unit, to determine whether the head of the driver has been detected; and
      detecting, via the control unit, a driver change based on a failure of detecting a head of the driver in a viewing range of the interior camera;
      wherein the interior camera is positioned so that a desired area of the vehicle, which includes a head of the driver in a regular driving position is detectable, and
      wherein a driver change is detected based on the failure to detect the head of the driver in the viewing range of the interior camera for a defined first time period.

7. A non-transitory machine-readable memory medium, on which is stored a computer program, which is executable by a processor, comprising:
   a program code arrangement having program code for identifying a driver change in a motor vehicle with the aid of an interior camera for monitoring the driver, by performing the following:
      providing, via a control unit having the processor, a head model, which characterizes a head of a driver of the motor vehicle;
      monitoring, with the interior camera and/or an interior sensor system, a present viewing direction of the driver;
      during the monitoring, checking, via the control unit, to determine whether the head of the driver has been detected; and
      detecting, via the control unit, a driver change based on a failure of detecting a head of the driver in a viewing range of the interior camera;
      wherein the interior camera is positioned so that a desired area of the vehicle, which includes a head of the driver in a regular driving position is detectable, and
      wherein a driver change is detected based on the failure to detect the head of the driver in the viewing range of the interior camera for a defined first time period.

8. A method for identifying a driver change in a motor vehicle with the aid of an interior camera for monitoring the driver, the method comprising:
   providing, via a control unit, a head model, which characterizes a head of a driver of the motor vehicle;

monitoring, with the interior camera and/or an interior sensor system, a present viewing direction of the driver;

during the monitoring, checking, via the control unit, to determine whether the head of the driver has been detected; and detecting, via the control unit, a driver change based on a failure of detecting a head of the driver in a viewing range of the interior camera;

wherein the interior camera is positioned so that a desired area of the vehicle, which includes a head of the driver in a regular driving position is detectable, and wherein if the head has not been detected, a check is carried out to determine whether the head was moved to the left or the right out of the viewing range of the camera, and if this is not the case, a conclusion may not be reached as to whether the head has moved to the left or the right out of the viewing range, or if it was detected that the head has not moved to the left or the right out of the viewing range of the camera, a check is carried out to determine whether the head is detected again within a defined first time period.

9. The method as recited in claim 8, wherein if it was detected that the head has moved to the left or right out of the viewing range of the camera, a check is carried out to determine whether the head was detected again within a defined second time period.

10. The method as recited in claim 9, wherein the defined second time period is shorter than the defined first time period.

* * * * *